(12) United States Patent
Issberner et al.

(10) Patent No.: US 7,547,753 B2
(45) Date of Patent: Jun. 16, 2009

(54) COPOLYMERS FOR AVOIDING DEPOSITS IN WATER SUPPLY SYSTEMS, PRODUCTION AND USE THEREOF

(75) Inventors: Joerg Issberner, Willich-Neersen (DE); Rainer Poeschmann, Toenisvorst (DE); Christian Flocken, Krefeld (DE)

(73) Assignee: Ashland Licensing and Intellectual Property LLC, Dublin, OH (US)

( * ) Notice: Subject to any disclaimer, the term of this patent is extended or adjusted under 35 U.S.C. 154(b) by 0 days.

(21) Appl. No.: 10/517,614

(22) PCT Filed: Jun. 14, 2003

(86) PCT No.: PCT/EP03/06291

§ 371 (c)(1),
(2), (4) Date: Aug. 5, 2005

(87) PCT Pub. No.: WO2004/003040

PCT Pub. Date: Jan. 8, 2004

(65) Prior Publication Data

US 2006/0100406 A1 May 11, 2006

(30) Foreign Application Priority Data

Jun. 26, 2002 (DE) ................. 102 28 628

(51) Int. Cl.
*C08F 232/08* (2006.01)
*C08F 20/06* (2006.01)

(52) U.S. Cl. ............... 526/309; 526/317.1; 526/272; 526/280; 526/318.3

(58) Field of Classification Search ........... 526/309, 526/317.1, 272, 280, 318.3
See application file for complete search history.

(56) References Cited

U.S. PATENT DOCUMENTS

| | | | | |
|---|---|---|---|---|
| 2,837,496 A | * | 6/1958 | Vandenberg | ......... 525/296 |
| 3,226,973 A | | 1/1966 | Evans et al. | |
| 4,975,504 A | * | 12/1990 | Parker | ......... 526/238.3 |
| 5,656,177 A | * | 8/1997 | Werres | ......... 210/764 |
| 5,693,731 A | * | 12/1997 | Williams et al. | ......... 526/224 |
| 5,756,624 A | * | 5/1998 | Behr et al. | ......... 526/309 |
| 6,084,032 A | * | 7/2000 | Fujikake et al. | ......... 525/203 |
| 6,805,954 B2 | * | 10/2004 | Silverberg et al. | ..... 428/355 AC |
| 6,927,315 B1 | * | 8/2005 | Heinecke et al. | ............ 602/41 |
| 2002/0032264 A1 | * | 3/2002 | Suzuki et al. | ......... 524/437 |
| 2004/0044138 A1 | * | 3/2004 | Aranguiz et al. | ......... 525/314 |

FOREIGN PATENT DOCUMENTS

| | | |
|---|---|---|
| DE | 1 948 198 | 4/1971 |
| DE | 242 815 A1 | 2/1987 |
| DE | 35 36 931 A1 | 4/1987 |
| DE | 43 28 817 A1 | 3/1995 |
| DE | 43 32 806 A1 | 3/1995 |
| DE | 44 11 556 A1 | 10/1995 |
| DE | 195 46 136 A1 | 6/1997 |
| EP | 0 219 043 | 4/1987 |
| EP | 0 240 253 B1 | 10/1987 |
| EP | 0 530 300 B1 | 3/1993 |
| EP | 0 767 145 A1 | 4/1997 |
| EP | 1 209 198 | 5/2002 |
| JP | 03250079 A | 11/1991 |
| JP | 10330315 A | 12/1998 |
| JP | 11240919 A | 9/1999 |
| SU | 1435580 A1 * | 7/1988 |
| SU | 1 435 580 | 11/1988 |
| WO | WO 9515296 A1 * | 6/1995 |
| WO | WO 97/39078 | 10/1997 |

OTHER PUBLICATIONS

The Random House "College Dictionary", p. 250.*
Excerpt from Chem. Zentralbl./ 1965 Issue-48.

* cited by examiner

*Primary Examiner*—Ling-Siu Choi
*Assistant Examiner*—Michael M Bernshteyn
(74) *Attorney, Agent, or Firm*—Oblon, Spivak, McClelland, Maier & Neustadt, P.C.

(57) ABSTRACT

The invention relates to copolymers made from monoethylenically unsaturated monomers with acid groups and a further hydrophobic monomer component for the prevention of inorganic and organic deposits in water supply systems. The invention further relates to a method for production of the above.

20 Claims, No Drawings

COPOLYMERS FOR AVOIDING DEPOSITS IN WATER SUPPLY SYSTEMS, PRODUCTION AND USE THEREOF

BACKGROUND OF THE INVENTION

1. Field of the Invention

The invention relates to copolymers of monoethylenically unsaturated acid-group-containing monomers and a further hydrophobic monomer component for prevention of inorganic and organic deposits in water-conveying systems, as well as to a method for synthesis of same.

2. Description of the Background

Water-conveying systems such as water and wastewater piping systems, cooling or heating loops, cooling lubricant systems, drilling fluids or production process water for material transport contain a large number of microorganisms, such as bacteria of the species *Pseudomonas vesicularis, Enterobacter cloacae, citrobacter freundii* and *Enterobacter amnigenus*, which because of the conditions to be encountered in these systems exhibit rapid growth. The proliferation and metabolism of the microorganisms can therefore lead to formation in these media of biological masses known as extracellular polymer substances, which often form gels together with inorganic polyvalent cations and adhere to equipment parts.

The deposits can lead in piping systems to a considerable pressure loss, which is disproportionately large compared with the resulting cross-sectional narrowing. Furthermore, these deposits can accelerate the corrosion of equipment parts, since the concentration of oxygen, the redox potential, the salt content and thus the conductivity are locally different from those in the other surroundings. If larger structures form from such deposits, the danger exists that they will be detached and leads to problems in machinery and production masses.

In cooling loops, the deposits represent an insulating layer, which can greatly reduce heat-transfer efficiency, since heat transfer takes place by diffusion rather than by convection at the locations of the deposits. It must be pointed out that organic coatings produce a much greater insulating effect than inorganic coatings.

Of particular importance are mixtures of organic and inorganic coatings, since organic coatings find favorable growth and viability conditions in the surface-rich inorganic coatings.

Especially in paper manufacture, these biological growth processes must be prevented in the production process. At present, microbicides (biocides, slimicides) based on intensively acting, toxic substances are used for this purpose.

Besides the problems associated with safe handling and transportation of such toxic substances, and that of limiting the effect to the desired area of application, it is necessary to use several of these microbicides in combination and in an alternating sequence, in order to counter the resistance of the microorganisms to the very product being used. In addition, the killing of microorganisms does not simultaneously mean that they have been removed from the system. In many cases, dead biomass remains behind, forming a source of nutrition for subsequent microorganisms. The deposits are simultaneously a barrier against biocides, and can effectively prevent them from penetrating. Thus it is critical to remove such gels and deposits from the system.

In WO 95/15296 there are described oil-in-water emulsions that prevent slime formation in water-conveying systems. The described oil-in-water emulsions are composed of a hydrophobic phase (oil phase), at least one emulsifier and water, and their hydrophobic phase contains an active agent that may be an acyclic, monocyclic and/or bicyclic terpene, especially a terpene hydrocarbon. Disadvantages are that only organic coatings can be prevented and that an emulsion is involved. It is known to the person skilled in the art that, depending on handling, storage temperature and storage time, emulsions tend to separate, thus losing their effect.

Besides the organic deposits due to microbial processes, deposits composed of resins and glue residues are present in the water-conveying systems of paper manufacture, especially in the processing of waste paper and recycled paper. These deposits can be formed even if the system does not contain any microorganisms. The negative effects on equipment parts and on the overall process are analogous to those described in the foregoing.

In U.S. Pat. No. 5,863,385 there is described the use of oil-in-water emulsions analogous to those of WO 95/15296 for the treatment of machinery in pulp, paper and cardboard manufacture and for cleaning such equipment of adhering contaminants in the form of natural resins and/or synthetic polymers, as well as for prevention of contamination of the equipment by such contaminants.

U.S. Pat. No. 5,916,857 describes the removal of sticky resin residues on paper machinery by cleaning agents composed of a mixture of aliphatic petroleum distillates, d-limonene and aliphatic dicarboxylic acid esters.

Besides the deposits of organic origin and composition just described, inorganic deposits formed from salts and compounds of the water used for the operating processes can occur in water-conveying systems. In particular, chlorides, sulfates, phosphates and hydrogen carbonates of the alkaline earths can be mentioned in this regard. Some of these cations and anions can form insoluble salts or oxides/hydroxides, which precipitate out if the respective solubility product is exceeded. The soluble hydrogen carbonates in particular are converted by heat to carbonates, and so part of the calcium salts precipitates out as poorly soluble calcium carbonate at high temperature. At high magnesium concentrations, magnesium carbonates can also precipitate out, as can even hydroxides at certain pH levels. A known coating problem in wastewater plants is also the formation of magnesium ammonium phosphate. Further possible deposits consist of calcium sulfate, silicates and phosphates in the most diverse forms, which tend to form coatings depending on system conditions, such as pH, temperature and degree of oversaturation.

In the area of paper manufacture, coatings of calcium oxalate are a particular problem, since oxalic acid occurs in wood and is formed during the bleaching process by oxidative decomposition of lignin and of monosaccharides, oligosaccharides or polysaccharides, such as xylane.

Substances that prevent the precipitation of poorly soluble compounds have long been known to the person skilled in the art as hardness stabilizers. Examples include inorganic polyphosphates, lignin sulfonates, naphthalenesulfonic acid condensation products, phosphonic acids, aminomethylene phosphonic acids, phosphoric acid esters, phosphonocarboxylic acids as well as polycarboxylic acids, as typified, for example, by partly saponified polyacrylamides or by polymers or copolymers of acrylic acid. A disadvantage of the cited substances is that some of these complexing agents are toxic and only inorganic deposits can be prevented.

Besides coatings of insoluble inorganic compounds that have just been formed, insoluble particles already present in the cooling system can also lead to coatings. This second large group of organic coating-forming substances is suspended solids, which result from the system or are introduced into the system from the air in the case of open cooling systems. The suspended solids sediment at places with very low flow velocities in the system. The coating formed in this way can also result from corrosion products of the materials, washed-in dust and solids from the make-up water. Furthermore, mixed deposits composed of sediments and hardness precipitates can also be formed.

Products that assume the function of dispersing agents, or in other words agents that stabilize solid particles against sedimentation and sludge formation by microdisperse distribution, have long been known, mostly from the polymer group. As an example, polycarboxylic acids of the type of partly saponified polyacrylamides are used for this purpose, as are polymers and copolymers of acrylic acid with various comonomers, as well as polystyrenesulfonates, polyvinylsulfonates, quaternary ammonium compounds of unsaponified polyacrylamides and polyalkylene glycols. The prior art is disclosed, for example, in the following publications: EP 818423 A1, U.S. Pat. No. 4,455,235, GB 2105319, GB 2152919. A disadvantage is that only inorganic deposits can be effectively prevented.

The person skilled in the art is aware that the chemical nature of the deposits in water-conveying systems is often not exactly known and that it fluctuates due to seasonal climatic variations. Because of the temperature-induced concentration fluctuations of dissolved gases, the content of soluble hardness builders varies simultaneously. The concentration of microorganisms is also subject to climate-related seasonal fluctuations. Thus, in a given production plant, it may be that different deposits must be prevented depending on the season, meaning in turn that different measures must be employed. This is particularly critical in periods when the weather is changing from winter to summer and vice versa.

Thus there has been no lack of attempts to suppress deposits simultaneously by the use of polymers and biocides, as described in EP 892838 B1 or WO 96/14092. A disadvantage in these methods also is the handling of toxic or hazardous biocides.

In U.S. Pat. No. 5,756,624 there are described terpene terpolymers composed of at least 10% terpene and of further monomers from the group of olefinically unsaturated monocarboxylic acids with 3 to 5 carbon atoms and their esters, obtained by the bulk polymerization method. One disadvantage among others in the described polymerization without solvents is that high temperatures are reached, causing undesired discoloration of the product. Furthermore, the polymers obtained are not water-soluble but at best are dispersible. It is proposed that they be used, among other purposes, as tackifying agents for adhesives and as builders.

The same is also true for DE 4332806 A1, in which the aforesaid uses are also described. This publication describes copolymers of terpenes without conjugated double bonds and vinyl compounds and/or dicarboxylic acids with a C—C double bond as well as their derivatives as comonomers, which preferably are obtained by means of radical bulk polymerization. Although organic liquids that have the ability to dissolve the terpene copolymers or the comonomers or monomers at room temperature are cited as organic solvents, this publication relies completely on radical bulk polymerization as the method for synthesis of the terpene copolymers described therein. A method for synthesizing these terpene copolymers by means of radical solution polymerization in the aqueous phase is not described. To the contrary, cationic and also radical solution polymerization processes are generally depicted as disadvantageous.

Copolymer dispersions that are dispersible only in water and that contain terpenes that are not soluble in water are described in DE 3536931 A1. The most important property of these copolymers cited therein is their suitability for use in binder dispersions, especially for industrial coatings, in which slight water uptake or water-induced swelling occurs and frequent or prolonged exposure of the coatings to water can be expected. Because of the aforesaid properties profile of these copolymers, it is not possible to use such copolymer dispersions containing these terpenes for prevention of inorganic and organic deposits in water-conveying systems, such as in service water or wastewater systems, in cooling loops, in seawater desalination plants, in reverse osmosis systems, or for conditioning of brackish water, for recovery of sugar from sugar beet, etc.

Radical copolymerizations of terpenes with maleic anhydride have also been described in Eur. Polym. J., 24 (5), 453-6, 1988. These reactions are performed as solution polymerizations, for example in tetrahydrofuran benzene, in dioxane or in toluene. These solvents, which in some cases are toxic and carcinogenic, must then be disposed of at considerable expense. Bulk polymerization is not described.

SUMMARY OF THE INVENTION

The object of the invention was therefore to provide, for prevention of deposit formation in water-conveying systems, substances or compositions and methods for synthesis thereof that, compared with the known agents used heretofore, do not exhibit any toxicity, can be synthesized simply from readily available components and can be stored for prolonged periods without loss of function. Because of the application in water-conveying systems, solubility in water is a requirement. They should be effective not only against inorganic deposits but also against organic deposits, and especially against combinations of the two deposits. Furthermore, effective prevention of sedimentation of solids under the given system conditions should be reliably achieved. Besides this stabilizing and dispersing effect, the substances or compositions should be uniformly effective, independently of seasonal temperature fluctuations.

The object is achieved according to the invention by providing water-soluble copolymers of
a) monoethylenically unsaturated, acid-group-containing monomers and
b) at least one of the following copolymerizable hydrophobic components that contains an unsaturated double bond
   b1) an acyclic, monocyclic and/or bicyclic terpene, especially a terpene hydrocarbon
   b2) an unsaturated, open-chain or cyclic, normal or isomeric hydrocarbon with 8 to 30 carbon atoms
   b3) an unsaturated fatty alcohol or an unsaturated fatty acid with respectively 8 to 30 carbon atoms and its esters or amides with saturated aliphatic alcohols, amines and acids, characterized in that the copolymers are formed by radical copolymerization of components a) and b) in the aqueous phase.

DETAILED DESCRIPTION OF THE PREFERRED EMBODIMENTS

Compared with the products of the prior art, the inventive copolymers have surprisingly good water solubility, the solutions being colorless and clear. Not only can they prevent the formation of both inorganic and organic coatings, but also, compared with the pure polyacrylates, they exhibit a greatly improved level of properties in preventing inorganic coatings.

In particular, the products are also suitable for prevention of mixed organic/inorganic coatings.

Furthermore, the described products are also eminently suitable for use against microorganisms in aqueous systems, such as in the manufacture of sugar from sugar beet or in aqueous circulations in paper manufacture or in clarifying plants.

Acid-group-containing unsaturated monomers a) that can be used according to the invention are monocarboxylic acids such as acrylic acid, methacrylic acid, crotonic acid, isocrotonic acid, vinylacetic acid, maleic acid half esters and maleic acid half amides, dicarboxylic acids such as maleic acid, fumaric acid and itaconic acid, sulfonic acids, such as vinylsulfonic acid, allylsulfonic acid, (meth)allylsulfonic acid and 2-acrylamido-2-methyl-1-propanesulfonic acid as well as their alkali metal and/or ammonium salts. Preferably the monocarboxylic acids are chosen from the group comprising acrylic acid and methacrylic acid, and the sulfonic acids are chosen from the group comprising vinylsulfonic acid, (meth)allylsulfonic acid and 2-acrylamido-2-methyl-1-propanesulfonic acid.

Particularly preferred monocarboxylic acids are acrylic acid and its alkali metal and/or ammonium salts and mixtures thereof. In a further preferred embodiment, monomers containing monocarboxylic acid and sulfonic acid groups as well as alkali metal and/or ammonium salts thereof are used together, the proportion of monomers containing sulfonic acid groups being 0.1 to 40 wt %, preferably 1 to 25 wt %.

The acid groups in the inventive copolymers are generally neutralized in a proportion of 1 to 75%, preferably 2 to 50% and particularly preferably 5 to 30%. They are used preferably as alkali metal or ammonium salts.

As examples of hydrophobic component b) for b1) there can be mentioned: Natural and synthetic terpenes, for example pinenes such as alpha-pinene and beta-pinene, terpinols, limonene (dipentene), beta-terpinenes, gamma-terpinenes, alpha-thujenes, sabinenes, delta-3-carenes, camphene, beta-cadinene, beta-caryophyllenes, cedrenes, bisalbones such as alpha-bisalbones, beta-bisalbones, gamma-bisalbones, zingiberenes, humulene, alpha-caryophyl-1-enes, alpha-citronellol, linalool, geraniol, nerol, ipsenol, alpha-terpineol, D-terpineol-(4), dihydrocarveol, nerolidol, farnesol, alpha-eudesmol, beta-eudesmol, citral, D-citronellal, carvone, D-pulegones, piperitones, carvenones, bisabolenes, beta-selinenes, alpha-santalenes, vitamin A, abietic acid and mixtures of these agents as well as extracts of natural occurrence, such as orange terpenes. Preferred among the terpenes are pinenes, nerol, citral and citronellal, camphene, limonene/dipentenes and linalool, Particularly preferred are limonene/dipentenes and pinenes.

As examples of unsaturated hydrocarbons b2) there can be mentioned: singly unsaturated straight-chain n-alkenes or monoolefins, branched isoalkenes and cycloalkenes, all of the aforesaid compounds with 8 to 30 carbon atoms, especially n-alkenes with terminal double bonds (α-olefins), such as 1-octene, 1-nonene, 1-decene, 1-undecene, 1-dodecene, 1-tridecene, 1-tetradecene, 1-pentadecene, 1-hexadecene, 1-heptadecene, 1-octadecene, 1-eicosene and 1-triacontene as well as all aforesaid alkenes/olefins with internal double bonds.

As examples of b3) there can be mentioned:

a fatty acid monoalkyl ester, a fatty acid amide or a fatty acid monoalkylamide of an unsaturated fatty acid, a monoester or polyester of an unsaturated fatty acid with polyols, except for polyethylene glycols, a monoamide or polyamide of unsaturated fatty acids and aliphatic polyamines with two to six nitrogen atoms, oleic acid, oleic acid octyl ester, glycerin monooleate and trioleate, sorbitan oleate. In a preferred embodiment, the fatty alcohol or fatty acid unit contains 8 to 30 carbon atoms.

As particularly preferred copolymerizable components b) there are used an acyclic terpene and/or a monocyclic and/or bicyclic terpene hydrocarbon.

The proportion of component b) in the copolymer generally ranges from 0.001 to 50 wt %, preferably 0.01 to 30 wt % and particularly preferably 0.2 to <20 wt %.

For further modification of the polymer properties there can be used optionally, besides the monomers mentioned in the foregoing, up to 40 wt % of further comonomers c) that are soluble in the aqueous polymerization mixture, such as acrylamide, methacrylamide, acrylonitrile, (meth)allyl alcohol ethoxylates and the mono(meth)acrylic acid esters of alcohols or ethoxylates, such as hydroxyethyl(meth)acrylate, hydroxypropyl(meth)acrylate, methoxypolyethylene glycol (meth)acrylate. As examples of further suitable monomers there can be mentioned: N,N-dimethylaminoethyl(meth)acrylate, N,N-dimethylaminopropyl(meth)acrylate, N,N-dimethylaminoethyl(meth)acrylamide and N,N-dimethylaminopropyl(meth)acrylamide, of which N,N-dimethylaminoethyl acrylate and N,N-dimethylaminopropyl acrylamide are preferably used. In addition, monomers according to the following formula can be used according to the invention as component c):

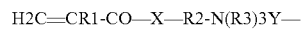

in which
R1=H, CH3
R2=C2 to C4 alkylene group
R3=H, C1 to C4 alkyl group
X=O, NH
Y=Cl, SO4

By hydrolysis reactions after polymerization, it is possible to form acid groups if necessary from these further comonomers.

The weight-average molecular weights Mw of the inventive copolymers fall within the range of smaller than or equal to 500,000 g/mol, preferably smaller than or equal to 100,000 g/mol and particularly preferably between 1,000 and 10,000 g/mol.

The subject matter of the invention also includes a method for synthesis of the inventive polymers, characterized in that the synthesis of the water-soluble copolymers takes place by radical polymerization of the monomer components in the aqueous phase.

The concentration of the monomers in the aqueous polymerization mixture is usually 10 to 70 wt %, preferably 20 to 60 wt %.

The acid monomer constituents a) can be partly or completely neutralized before polymerization, but preferably are neutralized in a proportion of 1 to 50%, particularly preferably 5 to 20% of monomers a). For neutralization there are preferably used bases that do not have a negative influence on the subsequent polymerization. Preferably there are used sodium and/or potassium hydroxide solution and/or ammonia, and particularly preferably sodium hydroxide solution. In principle, however, it is also possible to use other bases, such as aliphatic amines or aliphatic aminoalcohols.

In a further embodiment, the acid monomers are not neutralized before polymerization. If desired, the neutralization can then be performed after the polymerization reaction.

In a preferred embodiment of the method, the monomer constituents b) are added to the polymerization mixture as an oil-in-water emulsion. The proportion of the oil phase in the oil-in-water emulsion is 1 to 90 wt %, preferably 1 to 50 wt % and particularly preferably 5 to 30 wt % of the total emulsion. The synthesis of the emulsions that can be used according to the invention, especially stable oil-in-water emulsions, is known, for example, from WO 95/15296. For this purpose the oil components are emulsified in water by means of suitable known oil-in-water emulsifiers. The choice of emulsifiers is based on criteria known to the person skilled in the art.

Several methods can be considered for polymerization of the inventive copolymers in the aqueous phase. Examples include solution polymerization, inverse emulsion polymerization and inverse suspension polymerization. Preferably solution polymerization is performed. The solution polymerization can be performed continuously or in batches.

For adiabatic solution polymerization, the monomer solution is cooled to a temperature of below 30° C., preferably below 20° C. before the start of polymerization.

The polymerization can be initiated by various conditions, such as by irradiation with radioactive, electromagnetic or ultraviolet radiation or by redox reaction of two compounds, such as sodium hydrogen sulfite with potassium persulfate or ascorbic acid with hydrogen peroxide. Thermally induced decomposition of a radical initiator such as azobisisobutyronitrile, sodium peroxydisulfate, t-butyl hydroperoxide or dibenzoyl peroxide can also be used to start the polymerization. Furthermore, the combination of several of the aforesaid methods is possible. Preferably water-soluble initiator components are used.

For this purpose a broad spectrum of various options with regard to concentration ratios, temperatures, type and quantity of initiators and even post-reaction catalysts can be inferred from the prior art.

To adjust the desired molecular weight of the polymers, it may be necessary to perform the polymerization in the presence of molecular-weight regulators, or in other words conventional chain-breaking agents. Suitable molecular-weight regulators include, for example, aldehydes such as formaldehyde, acetaldehyde, propionaldehyde, n-butraldehyde, isobutryaldehyde, formic acid, ammonium formate, hydroxylamine and its sulfate, chloride or phosphate; SH-group-containing compounds such as thioglycolic acid, mercaptopropionic acid, mercaptoethanol, mercaptopropanol, mercaptobutanol, mercaptohexanol, thiomaleic acid, thiophenol, 4-tert-butylthiophenol, n-dodecylmercaptan and/or tert-dodecylmercaptan. Further examples of polymerization regulators are allyl alcohol, butenol, isopropanol, n-butanol, isobutanol, glycol, glycerin, pentaerythritol, hypophosphorous acid and its salts, such as sodium hypophosphite. To the extent that their use is necessary, the polymerization regulators are used in proportions of up to 30 wt % relative to the monomers. Preferably polymerization is carried out in the presence of 0.5 to 15 wt % of an SH-group-containing polymerization regulator relative to the monomers.

The addition of the monomer components to the polymerization mixture can take place either by introducing all monomers together or separately or by adding them in completely or partly mixed form. The choice of a suitable method is based among other considerations on the concentration of the monomers in the polymerization mixture, the size of the polymerization mixture and the rate with which component b) is incorporated into the polymer.

For incorporation of component b) in the polymer it may be advantageous to add emulsifiers to the polymerization mixture.

The pH of the polymer solutions formed according to the inventive method is adjusted with suitable bases such as sodium hydroxide solution or potassium hydroxide solution to between 1 and 10, preferably 3 and 7 and particularly preferably between 2.5 and 3.5.

The inventive copolymerization in the aqueous phase takes place in simple and problem-free manner and leads to clear solutions that can be used directly without isolation of the polymer. In contrast, in the complex methods of polymerization in environmentally polluting organic solvents or in mass polymerization methods, as described in the prior art, there are produced copolymers that are strongly discolored, water-insoluble and at best dispersible in water.

Use of the Inventive Copolymers

The copolymers or copolymer solutions that can be used according to the invention are used as is or in dilution with water or with water and/or solvent-containing mixtures. The addition of the copolymer into the water-conveying system can be achieved in any desired manner. Preferably addition takes place one time or several times or continuously at the points where a high burden due to microbes or their metabolic products occurs. A high microbe burden occurs, for example, in paper manufacture, in inflows of pulp from waste paper streams or other recycled materials.

In cooling systems, addition takes place either to the system directly or to the make-up water. The products are used in open and closed cooling loops with different degrees of thickening, especially between 1 and 15, while the temperatures lie between 5 and 250° C. depending on climate conditions and method. The pH in these applications ranges from about 4 to 12, and the quantity of inventive copolymers added amounts to 0.1 to 5000 ppm, preferably 0.5 to 1000 ppm and particularly preferably 1 to 100 ppm relative to the water-conveying system.

If the inventive copolymers are used in the field of paper manufacture, the content of component b) is preferably >10%, while for applications in the field of cooling water it is <10%, preferably <5% and particularly preferably <1%.

A further area of application of such substances is the dispersion and grinding of the most diverse inorganic pigments for the paper industry and the ceramics industry, the building-materials industry (for example, colored concrete) and the chemical industry. In dye manufacture also, dispersing agents are used for a large number of products.

As an example, approximately 0.1 to 5 wt % of dispersing agent relative to the pigment is used for dispersing and grinding, as in the dispersion of kaolin or $CaCO_3$, in which case the pH ranges between 6 and 10 and slurries having a pigment content of 50 to 80 wt % are produced. The slurries have a viscosity that preferably ranges between 200 and 1500 mPas.

Much larger quantities of dispersing agent are needed for dispersing and grinding of dyes. For example, 10 to 50% of dispersing agent relative to the dye proportion is used for dispersion dyes. By means of the inventive copolymers, the viscosity achieved is such that it facilitates pumping of slurries in the spray-drying process.

A further area of application of the products is to prevent coatings in communal and industrial clarifying plants. The pH in these applications ranges from about 4 to 12, and the quantities added range from 0.1 to 2000 ppm preferably 0.5 to 500 ppm and particularly preferably 2 to 100 ppm relative to the water-conveying system. The temperatures are different depending on climate conditions and process parameters, and can be as high as about 100° C.

In washing and cleaning agents, the inventive copolymers are advantageously used within the builder/cobuilder system.

In the field of the textile industry, the inventive copolymers are used in the pretreatment of textiles, bleaching, dyeing, rewashing, finishing and sizing.

In the leather industry, the inventive copolymers can be used not only for treatment of the raw animal hides but also in tanning and retanning of the leather. In leather tanning, the copolymers bring about increased chrome absorption by the leather, while in retanning they advantageously influence the color, fullness and cracking resistance.

For certain applications, it has proved advantageous to add further quantities of terpenes, preferably in the form of a water-in-oil emulsion, to the inventive copolymer solutions.

The invention will be explained by the following examples:

Test Methods:

1. Testing of Dynamic Scale Inhibition

The measurement is performed with a pressure measurement and control unit (P.M.A.C.).

A constant volume flow of 2 [l/h] of a stoichiometric mixture of a solution of calcium chloride dihydrate and sodium hydrogen carbonate in demineralized water (calculated calcium hardness: 30° dH) is passed through a spiral metal capillary (length: 1 [m], inside diameter: 1.1 [mm]) disposed in a heating bath at 90 [° C.]. The two solutions are first united directly upstream from the capillary. The anti-coating agent is added to the sodium hydrogen carbonate solution before the beginning of the experiment.

The experimental series is begun by adding 4.5 ppm of anti-coating agent (relative to the dry substance). The experimental time is one hour. As soon as coatings form on the inside walls of the metal capillary, its inside diameter decreases. Since the pumps deliver a constant volume flow, however, the pressure upstream from the metal capillary rises. The change of pressure is measured continuously and plotted by means of a recorder. If no coating has formed after the experimental time, a further experiment is performed with a reduced dosage. The objective is to determine the dosage at which coating formation takes place. The experiments are used to compare the products, and so the experiments on the products to be compared must be performed with the same capillary. A standard product, to which the results of the experimental series are related, is used for the experimental series with one or more products. For this purpose, experiments with this standard product are performed at the doses in question.

The scaling quotient used for comparison is calculated as follows: pressure of the product experiment after 40 minutes divided by the pressure of the standard experiment after 40 minutes. Obviously both experiments must be performed with the same dose.

2. Determination of the Relative Dispersing Capacity for Kaolin (DVK)

This test method is used to determine the dispersing capacity of polyelectrolytes for dirt particles in cooling-water loops.

Procedure: 1.170 g of kaolin (10,000 ppm) is weighed into a glass beaker and 116 ml of demineralized water is added by means of a pipette. Then the mixture is dispersed with a magnetic stirrer at about 600 rpm for 10 minutes. In the process, the pH is adjusted to 8.5 with 4% NaOH. While the magnetic stirrer is running, 19 ml is removed with a pipette and made up to a height of 13 cm in a test tube. Immediately thereafter about 1.5 ml of the dispersion is removed with a 2 ml syringe and needle. In the process, the tip of the needle must be immersed about 9 to 10 cm from the top rim of the test tube, or in other words about 6 to 7 cm from the liquid surface. From the removed sample, 1.000 g is immediately weighed into a glass beaker and diluted with demineralized water. The extinction of this sample is measured (blank, dispersion without dispersing agent at standing time of 0). To the remaining dispersion there is added dispersing agent equivalent to 20 ppm of dry substance.

The samples are left to stand for 5 hours, after which a sample of about 1.5 ml is removed from each as described in the foregoing and is diluted in the same way. The extinction of these samples is also measured immediately at 450 nm (test value).

Evaluation: The relative dispersing capacity after a standing time of 5 hours is obtained by comparison with the blank, which is set equal to 100%. The test values are then expressed as x %.

3. Apparatus for Testing on Organic Coatings

Flow Cell:

The measurement of the effectiveness of prevention of organic coatings is performed with a flow cell on the basis of evaluation of the deposits formed on a steel test body, and is intended to represent the conditions in a paper-manufacturing plant:

The setup consists of a 250-ml glass Erlenmeyer flask, which is agitated at 160 rpm on a shaking machine (GFL type 3031). The glass flask is filled with the aqueous solution and brought to a temperature of 45° C. The two ends of a silicone tube (4×7 mm) are dipped into the glass flask. By means of a pump (Watson Marlow 313 S), a volume flow of 80 ml per minute is adjusted in the tube. The total volume present in circulation is 50 ml. At the center of the tube there is disposed a silicone tube part of 10×15 mm in which there is placed a test body (15 mm in diameter and 2 mm thick, of stainless steel, HAST AISI 316L).

During the experiment, the entire system is maintained at a temperature of 45° C. Before each new experiment, the system components are thoroughly cleaned. The water existing in the respective paper plant is used. At first, 200 ppm of the polymers described in the examples and experimental examples are added to the water (Stora Enso Inkeroinen Factory, collected on 10 Jan. 2002, food packaging and graphic board, partly coated, 30% reject and 70% TMP, water pH 6.5; process temperature 50 to 55° C.) and left to flow for 20 hours in the flow cell. After a further addition of 200 ppm, the test unit is left for one further hour in the flow cell. Thereafter the test bodies are examined under a scanning electron microscope and/or an epifluorescence microscope and compared with one another in terms of number, size and shape of the deposits. A listing is compiled, in which the cleanest sample is rated as 1, the next cleanest as 2, and so on.

In the process, it must be ensured that, in any given series of comparative experiments, the same water is examined for the same time and under the same conditions.

4. Determination of the Dispersing Effect of Dispersing Agents in Pigment Slurries This method is used to determine the necessary quantity of dispersing agent for a pigment slurry of given pigment content (about 30 to 80%) and pH 166 g of demineralized water together with the desired quantity of dispersing agent and NaOH for pH adjustment is placed in a 600-ml glass beaker. 434 g of pigment divided into portions is sprinkled in under stirring at 4000 rpm. After the total quantity of pigment has been introduced, stirring is continued for 15 minutes at a speed of 5000 rpm. A solids content of about 73% is established in the slurry. After the stirring time of 15 minutes, the sample is tested for solids content with the infrared dryer and then the sample temperature is brought to 25° C. Thereafter the viscosity of the slurry is measured with a Brookfield viscometer at 100 rpm. It is recommended that this test be performed with about 4 different concentrations of dispersing agent, in order to determine the optimal dose.

A sample of the dispersion is diluted in a ratio of 1:9 with demineralized water and the pH is measured.

5. Determination of the Suitability of a Grinding/Dispersing Auxiliary for the Preparation of Pigment Slurries The "Dyno-Mill KDL Special" laboratory bead mill is used as the test apparatus. A mixture of 638 g of demineralized water and the desired quantity of grinding/dispersing agent as well as NaOH for pH adjustment is predispersed with a laboratory disperser. The resulting solids content of the slurry in this case is approximately 75 wt %.

The product is then transferred to the laboratory bead mill, and the mill and pump are started. The disk speed in m/s and the grinding duration are recorded. After the chosen time has elapsed, the slurry is brought to 20° C., transferred into the dissolver and stirred for 2 minutes at 1000 rpm. The viscosity is then measured with the Brookfield viscometer and the pH is determined in 10% dilution.

Finally, the particle-size distribution is determined with a sedimentation balance (Sedigraph).

Description of the Experiments:

COMPARISON EXAMPLE 1

70 g of orange terpene, 5.0 g of hexadecanol, 30 g of a 75% paraffin sulfonate, 7 g of an oleyl alcohol reacted with 20 mol of ethylene oxide and 5 g of a lauryl alcohol reacted with 3 mol of ethylene oxide are melted homogeneously and then heated under stirring to 85° C. 383 g of a 27% aqueous solution of a homopolyacrylic acid (Mw 2500) is slowly poured into this solution. Relative to the quantity of terpene used, 90% free terpene can be detected in the product by means of head-space GC.

COMPARISON EXAMPLE 2

70 g of orange terpene, 5.0 g of hexadecanol, 30 g of a 75% paraffin sulfonate, 7 g of an oleyl alcohol reacted with 20 mol of ethylene oxide and 5 g of a lauryl alcohol reacted with 3 mol of ethylene oxide are melted homogeneously and then heated under stirring to 85° C. 383 g of demineralized water is poured into this solution. The emulsion obtained in this way is thoroughly mixed with 348.84 g of a 30% aqueous solution of a homopolyacrylic acid (Mw 2500) at room temperature. Relative to the quantity of terpene used, 90% free terpene can be detected in the product by means of head-space GC.

EXAMPLE 1

73.55 g of water, 150.0 g of acrylic acid (AcS) and 225 g of an orange-terpene-in-water emulsion according to WO 95/15296 (terpene emulsion B) are placed in a polymerization flask (with stirrer, gas-inlet tube and reflux condenser), nitrogen is passed through for one hour and the reaction is initiated with 5.7 g of sodium peroxydisulfate dissolved in 10 g of water, 10 g of hydrogen peroxide (35%) and 20 g of mercaptoethanol.

Within 7 minutes, the temperature rises from 20° C. to 92° C. Beginning at the maximum temperature, stirring is continued at an internal temperature of 92° C. After 20 minutes, 0.75 g of azobis(2-amidinopropane)dihydrochloride (dissolved in 5 g of water) is added and left under reflux for 3 hours. A pH of 2.5 is adjusted with 50% sodium hydroxide solution. A clear solution is obtained. Relative to the quantity of terpene used, less than 40% of free terpene can be detected in the product by means of head-space GC. Thus more than 60% of the terpene used has been copolymerized.

COMPARISON EXAMPLE 3

Analogous, but with Terpene Emulsion B from WO 95/15296

COMPARISON EXAMPLE 4

The procedure of Example 15 from U.S. Pat. No. 5,756,624 is used here.

4a) The weight ratio of monomers in the resulting polymer (maleic anhydride/orange terpene) is 70%/30%

4b) The weight ratio of monomers in the resulting polymer (maleic anhydride/orange terpene) is 80%/20%

In both cases, there is obtained a firm brown paste that is insoluble in water. However, the paste can be partly dissolved and dispersed in aqueous sodium hydroxide. 20% aqueous dispersions of the polymer were used.

COMPARISON EXAMPLE 5

Homopolyacrylic Acid with an Average Molecular Weight of Mw 2500

EXAMPLE 2

415.6 g of water, 188.8 g of acrylic acid, 47.2 g of sodium methallylsulfonate and 11.8 g of a terpene-in-water emulsion according to WO 95/15296 (terpene emulsion B) are placed in a polymerization flask (with stirrer, gas-inlet tube and reflux condenser), nitrogen is passed through for one hour and the reaction is initiated with 8 g of sodium peroxydisulfate, 15 g of hydrogen peroxide (35%) and 20 g of mercaptoethanol.

Within 10 minutes, the temperature rises from 25° C. to 84° C. Beginning at the maximum temperature, stirring is continued at an internal temperature of 90° C. After 20 minutes, 1 g of azobis(2-amidinopropane)dihydrochloride (dissolved in 5 g of water) is added and stirred for 2 hours. 15 g of hydrogen peroxide (35%) is then added and left under reflux for 3 hours. A clear solution is obtained. By means of head-space GC, only 2 ppm of free terpene can still be detected in the product. The remaining proportion has been copolymerized.

EXAMPLE 3

As under Example 2. Instead of the terpene-in-water emulsion, 1.7 g of orange terpene was used.

A clear solution is obtained.

COMPARISON EXAMPLE 6

Copolymer of acrylic acid and 20 wt % of sodium methallylsulfonate (NaMAS), average molecular weight Mw 1900.

COMPARISON EXAMPLE 7

As under Comparison Example 2, except that the product under Comparison Example 6 was used instead of a homopolyacrylic acid.

COMPARISON EXAMPLE 8

As under Comparison Example, except that the product under Comparison Example 6 was used instead of a homopolyacrylic acid.

TABLE 1a

| Comparison [VB] | VB1 | VB2 | Example [B] B1 | VB3 |
|---|---|---|---|---|
| by analogy with patent | EP 892838 B1 or WO 96/14092 | EP 892838 B1 or WO 96/14092 | | WO 95/15296 |
| Molecular weight per GPC (Mw) | 2500 | 2500 | 2500 | |
| Monomer | AcS | AcS | AcS | |
| Orange terpene proportion in the formulation [%] | 14 | 6 | 6 | 14 |
| P-Mac standard scaling quotient | 4.8 | 1.5 | 1.2 | <40 minutes |
| Kaolin dispersing capacity [%] | 73 | 78 | 83 | 30 |
| Organic deposit | 2 | 4 | 1 | 3 |
| Comment | Phase separation | Phase separation | Clear solution | Emulsion |
| Water-soluble | Yes | Yes | Yes | No |

TABLE 1b

| Comparison [VB] | VB4a | Example [B] VB4b | VB5 |
|---|---|---|---|
| by analogy with patent | U.S. Pat. No. 5,756,624 | U.S. Pat. No. 5,756,624 | |
| Molecular weight per GPC (Mw) | Not determined | Not determined | 2500 |
| Monomer | MSA/terpene | MSA/terpene | AcS |
| Orange terpene proportion in the formulation [%] | 6 | 4 | 0 |
| P-Mac standard scaling quotient | <40 minutes | <40 minutes | 1.0 |
| Kaolin dispersing capacity [%] | 32 | 37 | 82 |
| Organic deposit Comment | Brown dispersion in aqueous NaOH | Brown dispersion in aqueous NaOH | Clear solution |
| Water-soluble | Partly | Partly | Yes |

TABLE 2a

| Comparison [VB] | VB6 | Example [B] VB7 | VB8 |
|---|---|---|---|
| by analogy with patent | EP 818423 A1 U.S. Pat. No. 4,455,235 | by analogy with EP 892838 B1 or WO 96/14092 | by analogy with EP 892838 B1 or WO 96/14092 |
| Molecular weight per GPC (Mw) | 1900 | 1900 | 1900 |
| Monomer | AcS/NaMAS | AcS/NaMAS | AcS/NaMAS |
| Orange terpene proportion in the formulation [%] | 0 | 0.3 | 0.3 |
| P-Mac standard scaling quotient | 1.0 | 1.2 | 1.3 |
| Kaolin dispersing capacity [%] | 87 | 85 | 85 |
| Comment | Clear solution | Cloudy solution | Cloudy solution |

TABLE 2b

| Comparison [VB] | Example [B] B2 | B3 |
|---|---|---|
| Molecular weight per GPC (Mw) | 1900 | 1900 |
| Monomer | AcS/NaMAS | AcS/NaMAS |
| Orange terpene proportion in the formulation [%] | 0.3 | 0.3 |
| P-Mac standard scaling quotient | 0.9 | 0.5 |
| Kaolin dispersing capacity [%] | 86 | 85 |
| Comment | Clear solution | Clear solution |

Results of the Dispersion Experiments with $CaCO_3$

The following Table 3 contains results on the effectiveness as a dispersing agent with the polymers from Examples 1 and 2 as well as from Comparison Example 1.

TABLE 3

| Product | Dose % dry/dry | Viscosity/mPas at 100 rpm | $CaCO_3$ % | pH |
|---|---|---|---|---|
| VB1 | 0.08 | 630 | 81 | 9.9 |
| B1 | 0.08 | 289 | 81 | 9.9 |
| B2 | 0.08 | 481 | 81 | 9.7 |

The inventive examples with the content of orange terpene clearly exhibit better dispersing capacities than does the comparison example. A lower viscosity is generally a clear sign of better dispersion of the particles.

Results of the Grinding/Dispersion Experiments with $CaCO_3$

The following Table 4 shows the effectiveness of the inventive polymers as a grinding auxiliary.

TABLE 4

| Product | Dose % dry/dry | Visc./mPas at 100 rpm | $CaCO_3$ % | pH | Particles % < 2 μm | Particles % < 1 μm |
|---|---|---|---|---|---|---|
| VB6 | 0.08 | 1850 | 76 | 9.9 | 93.5 | 71.6 |
| B1 | 0.08 | 1220 | 76 | 9.8 | 91.3 | 70.1 |
| B2 | 0.08 | 950 | 76 | 9.7 | 91.6 | 70.4 |

The inventive polymers exhibit very good behavior for use as grinding auxiliaries. The comparison with a common grinding-auxiliary polymer shows that the pigment slurries obtained with the inventive copolymers have much lower viscosities.

The invention claimed is:

1. A clear, water-soluble copolymer derived from a monomer composition, comprising:
   $a_1$) a monoethylenically unsaturated, acid-group-containing monomer selected from the group consisting of monocarboxylic acids and dicarboxylic acids;
   $a_2$) a monoethylenically unsaturated sulfonic acid; and
   b) a copolymerizable hydrophobic monocyclic terpene hydrocarbon;
   wherein the copolymer is formed by radical copolymerization of components $a_1$), $a_2$) and b) in an aqueous phase and the proportion of component b) in the copolymer ranges from 0.2 to <20 wt %.

2. The copolymer according to claim 1, wherein the monoethylenically unsaturated, acid-group-containing monomer comprises a monoethylenically unsaturated monocarboxylic acid.

3. The copolymer according to claim 1, wherein the acid-group-containing monomer is a member selected from the group consisting of acrylic acid, methacrylic acid and vinylacetic acid.

4. The copolymer according to claim 1, wherein the acid groups in the monomer are neutralized in a proportion of 1 to 75%.

5. The copolymer according to claim 4, wherein the acid groups in the monomer are neutralized in a proportion of 5 to 30%.

6. The copolymer according to claim 1, further comprising up to 40 wt % of an acid-group-free, water-soluble monomer.

7. The copolymer according to claim 1, having a weight-average molecular weight of smaller than or equal to 500,000 g/mol.

8. The copolymer according to claim 7, having a weight-average molecular weight ranging from 1,000 and 10,000 g/mol.

9. A method for synthesis of a clear, water-soluble copolymer of:
   $a_1$) a monoethylenically unsaturated, acid-group-containing monomer selected from the group consisting of monocarboxylic acids and dicarboxylic acids
   $a_2$) a monoethylenically unsaturated sulfonic acid, and
   a copolymerizable hydrophobic monocyclic terpene hydrocarbon, comprising:
   forming the copolymer by radical polymerization of the monomer components in the aqueous phase.

10. The method according to claim 9, wherein the concentration of the copolymerizable constituents in the aqueous polymerization mixture is 10 to 70 wt %.

11. The method according to claim 9, wherein component b) is in the form of an oil-in-water emulsion that is formed from a hydrophobic phase (oil phase), at least one emulsifier and water.

12. The method according to claim 9, wherein the radical polymerization is carried out in the presence of molecular-weight regulators.

13. A method for preventing organic, inorganic and mixed organic/inorganic deposits in a water-conveying system, comprising:
   applying to the system an effective amount of a clear, water-soluble copolymer of
   $a_1$) a monoethylenically unsaturated, acid-group-containing monomer selected from the group consisting of monocarboxylic acids and dicarboxylic acids;
   $a_2$) a monoethylenically unsaturated sulfonic acid, and
   a copolymerizable hydrophobic monocyclic terpene hydrocarbon,
   wherein the copolymer is formed by radical copolymerization of components $a_1$), $a_2$) and b) in the aqueous phase.

14. The method according to claim 13, applied in service water or wastewater systems, in cooling loops, in seawater desalination plants, in reverse osmosis systems, and for conditioning of brackish water and in the recovery of sugar from sugar beet.

15. The method according to claim 14, applied in the recovery of sugar from sugar beet for treatment of aqueous suspensions containing chopped sugar beet.

16. The method according to claim 13, wherein the copolymer is added to the water-conveying system in a proportion of 0.1 to 5000 ppm.

17. The method according to claim 16, wherein the copolymer is added to the water-conveying system in a proportion of 1 to 100 ppm.

18. A method for grinding and dispersing of pigments, comprising:
   grinding and dispersing pigments in the presence of an auxiliary agent comprising the copolymer of claim 1.

19. A textile-treatment and leather-treatment process, comprising:
   treating a textile or leather with the copolymer of claim 1.

20. A cleaning-agent or washing-agent formulation, comprising:
   the copolymer of claim 1 as an auxiliary agent.

* * * * *